Patented Nov. 21, 1939

2,181,051

UNITED STATES PATENT OFFICE 2,181,051

MONOAZO DYESTUFFS

Richard Fleischhauer, Frankfort-on-the-Main-Fechenheim, Germany, assignor to General Aniline Works, Inc., New York, N. Y., a corporation of Delaware No Drawing. Application January 21, 1938, Serial No. 186,082. In Germany January 25, 1937

4 Claims. (Cl. 260—199)

The present invention relates to monoazodyestuffs which are capable of being converted into their metal complex compounds. More particularly it relates to monoazodyestuffs of the general formula:

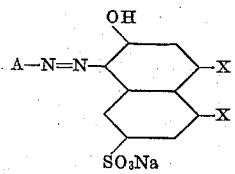

wherein A stands for the radicle of any diazo component selected from the group consisting of the benzene and naphthalene series containing in o-position to the nitrogen atom a group capable of being metallized, one X stands for an acylamino group and the other X stands for hydrogen, which monoazodyestuffs may be converted in substance or on the fiber into their metal complex compounds.

The new monoazodyestuffs may be prepared by combining diazo compounds containing in ortho-position to the diazo group a group which can be converted into a metal complex group, with N-acylamino-hydroxynaphthalene sulfonic acids of the general formula:

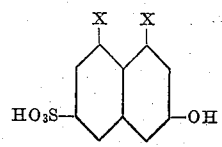

wherein one X stands for an acylamino group and the other X stands for hydrogen.

The N-acylamino-hydroxynaphthalene sulfonic acids employed as coupling components are obtainable by acylating the corresponding aminohydroxynaphthalene sulfonic acids according to the usual methods. These aminohydroxynaphthalene sulfonic acids may be prepared by a caustic alkali melt of 1-aminonaphthalene-3.6-disulfonic acid. The mixture of 1-amino-3-hydroxynaphthalene-6-sulfonic acid and 1-amino-6-hydroxynaphthalene-3-sulfonic acid formed may be resolved by taking account of the different solubilities of their salts. One may also acylate the above mixture of the two isomeric acids and use the mixture of isomeric N-acyl derivatives thus obtained for the formation of the monoazodyestuffs.

The new dyestuffs can also be prepared by treating with suitable acylating agents the corresponding aminoazodyestuffs derived from the above aminohydroxynaphthalene sulfonic acids.

When aftertreated with metallizing agents, for instance when chromed according to one of the usual methods in substance or on the fiber, the new dyestuffs yield valuable dyeings of excellent fastness properties.

The properties of the new dyestuffs may be varied by a suitable selection of the acyl radicles. For instance in the case of aliphatic acyl radicles such as the acetyl, propionyl, methoxyacetyl, butyryl, chloroacetyl, ethylsulfonyl and carbethoxy radicle generally dyestuffs are obtained of particularly good levelling power, whereas with aromatic acyl radicles, such as the benzoyl, toluenesulfonyl and phenoxyacetyl radicles and their nuclear substitution products or also with aliphatic acyl radicles containing more than 4 carbon atoms, dyestuffs are formed of particularly good fastness properties.

In order to further illustrate my invention the following examples are given, the parts being by weight and all temperatures in degrees centigrade, but I wish it, however, to be understood that my invention is not limited to the examples given nor to the exact conditions stated therein.

Example 1

19.9 parts of 4.6-dinitro-2-aminophenol are diazotized in the usual manner and the diazo solution obtained is combined in the presence of an excess of sodium carbonate with an aqueous solution of 35 parts of 1-benzoylamino-6-naphthol-3-sulfonic acid. When the combination is complete, the dyestuff formed of the formula:

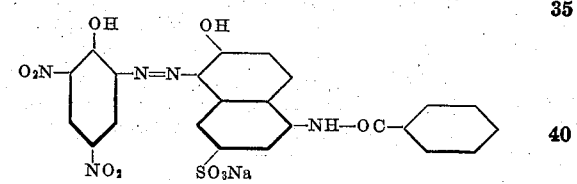

is filtered off and dried. It is a dark powder, soluble in water with a reddish violet and in concentrated sulfuric acid with a red color, and it dyes wool from an acid bath violet-brown shades. When aftertreated with chromium salts according to the usual methods, reddish black dyeings of very good fastness to fulling, potting and light are obtained. The aftertreatment may be performed, for example, in the following manner. The wool material which has been dyed in an acid bath, is brought at about 70° into an acid bath, then the necessary amount of potassium chromate is added and the dyeings are heated to boiling for about 30 minutes in this bath, whereby the chromium complex compound of the dyestuff is formed on the fiber.

The dyestuff may also be treated in substance with chromium salts, for instance by heating to boiling the aqueous solution of the dyestuff together with an excess of chromium fluoride or chromium formate. In this manner a dark powder is obtained, soluble in water and dyeing wool fast dark-grey to black shades.

The analogous dyestuff obtained by employing 1-acetylamino-3-naphthol-6-sulfonic acid as coupling component, in the above example, yields somewhat more bluish black shades when aftertreated on the fiber with chromium salts.

*Example 2*

18.9 parts of 4-chloro-6-nitro-2-aminophenol are diazotized in the usual manner and the diazo solution obtained is allowed to run into an aqueous solution of 29 parts of 1-acetylamino-3-naphol-6-sulfonic acid containing an excess of sodium carbonate. When the combination is complete, the dyestuff formed of the formula:

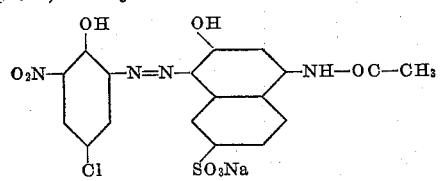

is separated and dried. It is a dark powder, soluble in water with a reddish blue and in concentrated sulfuric acid with a red-violet color, and it dyes wool from an acid bath blue shades. When aftertreated with chromium salts, bluish grey dyeings of good fastness to fulling, potting and light are obtained.

Similar dyestuffs, which yield on wool valuable bluish grey shades of very good fastness to fulling and light when aftertreated with chromium salts, are obtained by employing as coupling component, in the above example, for instance, 1-carbomethoxyamino-3-naphthol-6-sulfonic acid, 1-carbethoxyamino-3-naphthol-6-sulfonic acid, 1-benzoylamino-3-naphthol-6-sulfonic acid, 1-methoxyacetylamino-3-naphthol-6-sulfonic acid and the like.

*Example 3*

14.4 parts of 4-chloro-2-aminophenol are diazotized in the usual manner and the diazo solution obtained is combined with an aqueous solution of 29 parts of 1-acetylamino-3-naphthol-6-sulfonic acid in the presence of an excess of sodium carbonate. Then the dyestuff formed of the formula:

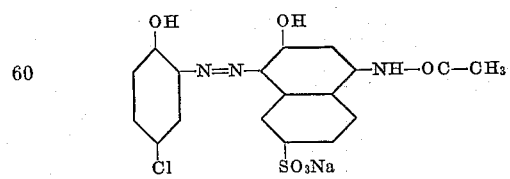

is separated and dried. It is a brown powder, soluble in water and in concentrated sulfuric acid with a red color, and dyes wool red shades. When aftertreated with chromium salts blue-violet dyeings of good fastness to potting and light are obtained. The dyestuff exhibits a good levelling power.

The chromium complex compound of the dyestuff may be prepared in substance, for example, by heating the dyestuff together with chromium formate to about 110 to 120°. The product thus obtained dyes wool from an acid bath fast violet shades.

*Example 4*

22.4 parts of 4-chloro-2-aminophenol-6-sulfonic acid are diazotized in the usual manner and the diazo solution obtained is combined at about 20° with an aqueous solution of 35 parts of 1-benzoylamino-3-naphthol-6-sulfonic acid containing an excess of sodium carbonate. The dyestuff formed of the formula:

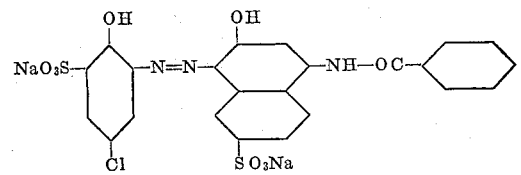

is separated and dried. It is a dark powder, soluble in water with a reddish blue and in concentrated sulfuric acid with a reddish violet color, and dyes wool brown-red shades. When aftertreated with chromium salts very fast blue dyeings are obtained.

The analogous dyestuff prepared by employing 4-methyl-2-aminophenol-6-sulfonic acid as diazo component in the above example dyes wool red shades. When aftertreated with chromium salts reddish blue dyeings of good fastness to fulling, potting and light are obtained.

*Example 5*

The diazo solution obtained by diazotizing 13.7 parts of 2-aminobenzoic acid in the usual manner is combined with an aqueous solution of 29 parts of 1-acetylamino-6-naphthol-3-sulfonic acid containing an excess of sodium carbonate. The dyestuff formed of the formula:

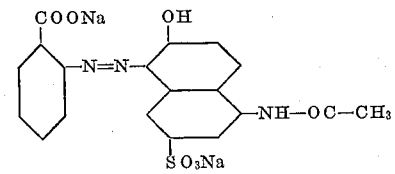

is separated and dried. It is a brick-red powder, soluble in water with an orange and in concentrated sulfuric acid with an orange-red color, and dyes wool from an acid bath bright orange shades. When aftertreated with chromium salts red dyeings of good fastness to fulling and light are obtained.

The identical dyestuff may be prepared in the following manner. The diazo solution obtained by diazotizing 12.7 parts of 2-aminobenzoic acid in the usual manner is combined with an aqueous solution of 25 parts of 1-amino-6-naphthol-3-sulfonic acid containing an excess of sodium carbonate. The aminoazodyestuff thus obtained which dyes wool red-brown shades, is separated, dissolved in water and treated with an excess of acetic anhydride, until the red-brown color of the solution has been converted into a clear orange color. Then the sodium salt of the acetylated dyestuff is separated and dried.

*Example 6*

28.4 parts of 1-amino-2-hydroxy-6-nitronaphthalene-4-sulfonic acid are diazotized and the paste of the diazo compound obtained is introduced into an aqueous solution of 29 parts of 1-acetylamino-3-naphthol-6-sulfonic acid in the presence of an excess of calcium hydroxide. The mixture is stirred until the combination is complete. Then the sodium salt of the dyestuff formed of the formula:

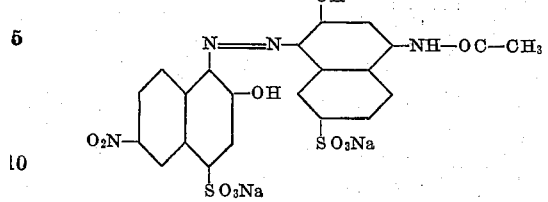

is separated and dried. It is a black powder, soluble in water with a greenish blue and in concentrated sulfuric acid with a violet color, and dyes wool reddish violet shades. When aftertreated with chromium salts grey dyeings of excellent fastness properties, especially to fulling, potting and light, are obtained.

The analogous dyestuff obtained by employing 1-acetylamino-6-naphthol-3-sulfonic acid as coupling component yields somewhat more dull grey shades of similar good fastness properties when aftertreated with chromium salts.

*Example 7*

18.9 parts of 4-chloro-6-nitro-2-aminophenol are diazotized in the usual manner and the diazo solution obtained is allowed to run into an aqueous solution of 38 parts of 1-phenoxyacetyl-amino-6-naphthol-3-sulfonic acid containing an excess of sodium carbonate. The dyestuff thus obtained of the formula:

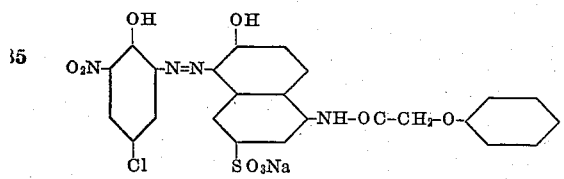

is separated and dried. It is a dark powder, soluble in sodium carbonate solution with a bluish-violet and in concentrated sulfuric acid with a blue-red color, and dyes wool very fast blue-grey shades when aftertreated with chromium salts.

The analogous dyestuff prepared by employing 5-nitro-2-aminophenol as diazo component is a dark powder which is soluble in sodium carbonate solution with a blue and in concentrated sulfuric acid with a pink color and dyes wool very fast green-grey shades when aftertreated with chromium salts.

*Example 8*

22.4 parts of 4-chloro-2-aminophenol-6-sulfonic acid are diazotized in the usual manner and the diazo solution obtained is combined at about 20° with an aqueous solution containing an excess of sodium carbonate and 29 parts of a mixture of about 75% 1-acetylamino-6-naphthol-3-sulfonic acid and about 25% 1-acetyl-amino-3-naphthol-6-sulfonic acid. (This mixture is obtainable by acetylating the mixture of the two isomeric aminohydroxynaphthalene sulfonic acids which is formed when 1-aminonaphthalene-3.6-disulfonic acid is subjected to an alkaline melt.) When the combination is complete, the dyestuff formed which consists in a mixture of the two isomeric compounds of the following formulae:

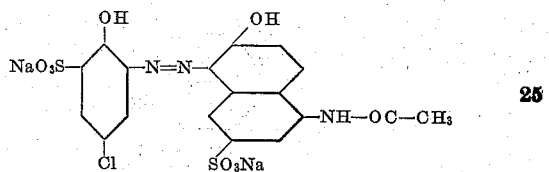

and

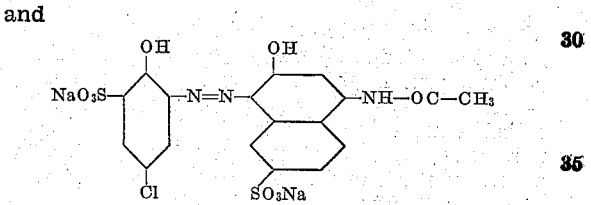

is separated and dried. It is a dark powder, soluble in water with a reddish blue and in concentrated sulfuric acid with a violet-red color, and dyes wool red shades. When aftertreated with chromium salts very fast blue dyeings are obtained.

By variation of the diazo- and coupling components various further dyestuffs may be obtained. The following table shows some examples thereof, but it is to be understood, that the scope of my invention is not limited to these examples.

| Diazo component | Coupling component | Color of the sulfuric acid solution | Shade on wool | |
|---|---|---|---|---|
| | | | Direct | Aftertreated with chromium salts |
| 2-aminobenzoic acid | (a) 1-acetylamino-3-naphthol-6-sulfonic acid | Red | Orange | Dark-red. |
| Do | (b) 1-acetylamino-6-naphthol-3-sulfonic acid | do | Red | Red. |
| 5-nitro-2-aminobenzoic acid | (a) | Bluish red | Orange | Dark-red. |
| Do | (b) | Yellowish-red | Red | Do. |
| 5-nitro-2-aminophenol | (c) 1-benzoylamino-3-naphthol-6-sulfonic acid | Violet | Bluish-red | Greenish-grey. |
| Do | (d) 1-benzoylamino-6-naphthol-3-sulfonic acid | Bluish-red | Pink | Bluish grey. |
| 4-chloro-6-nitro-2-aminophenol | (d) | do | Bluish-violet | Grey. |
| 4-methyl-6-nitro-2-aminophenol | (a) | Reddish-violet | Brown | Violettish-grey. |
| Do | (b) | Bluish-red | Dark-red | Greyish-violet. |
| Do | (c) | Reddish-violet | Reddish-brown | Bluish-grey. |
| 4-nitro-6-methyl-2-aminophenol | (a) | Bluish-red | Brown | Blackish-brown. |
| Do | (b) | Red | Dark-brown | Dark-brown. |
| 2-aminophenol-4-sulfonic acid | (a) | Bluish-red | Red | Violet. |
| Do | (b) | Red | do | Reddish-violet. |
| 4-nitro-6-chloro-2-aminophenol | (c) | Bluish-red | Brownish-violet | Dark-brown. |
| 4-methyl-5-nitro-2-aminophenol | (d) | Violettish-red | Bluish-red | Bluish-grey. |
| 4-nitro-2-aminophenol-6-sulfonic acid | (a) | Bluish-red | Dark-violet | Dark-brown. |
| Do | (b) | Red | do | Do. |
| Do | (d) | do | do | Do. |
| 4-chloro-2-aminophenol-6-sulfonic acid | (a) | Reddish-violet | Orange-red | Blue. |
| Do | (b) | Bluish-red | Brick-red | Do. |
| Do | (d) | do | Brownish-red | Do. |
| 4-methyl-2-aminophenol-6-sulfonic acid | (a) | Reddish-violet | Red | Do. |
| Do | (b) | Bluish-red | do | Violettish-blue. |
| Do | (c) | Reddish-violet | do | Blue. |
| Do | (d) | Bluish-red | do | Violettish-blue. |

| Diazo component | Coupling component | Color of the sulfuric acid solution | Shade on wool | |
|---|---|---|---|---|
| | | | Direct | Aftertreated with chromium salts |
| 6-chloro-2-aminophenol | (a) | Cherry-red | Reddish-brown | Violet. |
| Do | (b) | Red | do | Reddish-violet. |
| 4-chloro-2-aminophenol | (b) | Reddish-violet | Bluish-red | Violet. |
| 6-nitro-1-amino-2-hydroxynaphthalene-4-sulfonic acid. | 1-(4'-methyl-benzene-sulfamido)-3-naphthol-6-sulfonic acid. | Violet | Dark-violet | Dark-grey. |
| Do | 1-(4'-methyl-benzene-sulfamido)-6-naphthol-3-sulfonic acid. | do | do | Do. |
| 2-aminophenol-4-sulfonic acid diethylamide. | (a) | Bluish-red | Brick-red | Violet. |
| Do | (b) | Red | Red | Reddish-violet. |
| Do | (c) | Bluish-red | Dull-red | Greyish-violet. |
| Do | (d) | Red | do | Dark-violet. |
| 4-chloro-5-nitro-2-aminophenol | (d) | Violettish-red | Bluish-red | Bluish-grey. |
| Do | (c) | Violet | Red | Greenish-grey. |

I claim:

1. The monoazodyestuffs of the formula:

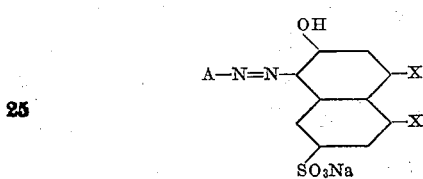

wherein A stands for the radicle of a diazo component selected from the group consisting of the benzene and naphthalene series containing in o-position to the nitrogen atom a group capable of being metallized, one X stands for an acylamino group and the other X stands for hydrogen, which dyestuffs dye animal fibers various shades of excellent fastness properties when after-treated with chromium salts.

2. The monoazodyestuff of the formula:

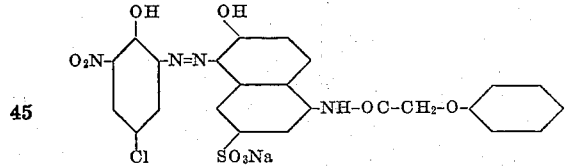

which dyestuff dyes wool very fast bluish grey shades when aftertreated with chromium salts.

3. The mixture of the two isomeric monoazodyestuffs of the formulae:

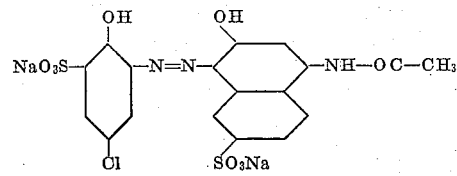

and

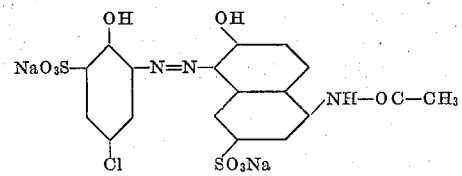

which dyestuff mixture yields on wool very fast blue shades when aftertreated with chromium salts.

4. The monoazodyestuff of the formula:

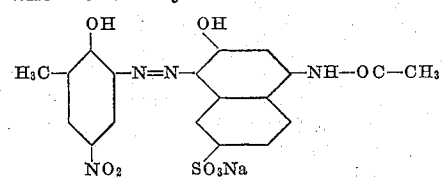

which dyestuff yields on wool very fast blackish brown shades when aftertreated with chromium salts.

RICHARD FLEISCHHAUER.